US012681707B2

(12) United States Patent 
Claudino Pereira Lopes

(10) Patent No.: US 12,681,707 B2 
(45) Date of Patent: Jul. 14, 2026

(54) COMPILATION SYSTEM AND METHOD

(71) Applicant: Microsoft Technology Licensing, LLC, Redmond, WA (US)

(72) Inventor: Nuno Claudino Pereira Lopes, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 18/572,469

(22) PCT Filed: Jun. 10, 2022

(86) PCT No.: PCT/US2022/032924

§ 371 (c)(1), 
(2) Date: Dec. 20, 2023

(87) PCT Pub. No.: WO2023/278123

PCT Pub. Date: Jan. 5, 2023

(65) Prior Publication Data

US 2024/0370239 A1      Nov. 7, 2024

(30) Foreign Application Priority Data

Jun. 29, 2021      (EP) .................................... 21182441

(51) Int. Cl. 
G06F 8/41            (2018.01)

(52) U.S. Cl. 
CPC .................................... G06F 8/452 (2013.01)

(58) Field of Classification Search 
CPC ....................................................... G06F 8/452 
See application file for complete search history.

(56) References Cited

U.S. PATENT DOCUMENTS

2002/0194580 A1* 12/2002 Ramasamy ......... G06F 11/3612 
                                                                717/130 
2009/0037887 A1*  2/2009 Chavan ............... G06F 11/3636 
                                                                717/128

(Continued)

FOREIGN PATENT DOCUMENTS

JP        2009116547  A  *  5/2009 
WO       2020012196  A1     1/2020 
WO       2021074874  A1     4/2021

OTHER PUBLICATIONS

Acosta., et al., "CDE: A Compiler-driven, Dependence-Centric, Eager-executing Architecture for the Billion Transistors Era," Workshop on Complexity-Effective Design (WCED 2003), 2003, retrieved on: https://www.researchgate.net/publication/228687787_Cde_A_compiler-driven_dependence-centric_eager-executing_architecture_for_the_billion_transistors_era, 13 pages.

(Continued)

*Primary Examiner* — Phillip H Nguyen 
(74) *Attorney, Agent, or Firm* — Barta Jones, PLLC

(57)            ABSTRACT

A dispatcher steps through a sequence of operations in a source program, including looping through the loops and/or branching at the branches, and maps each source operation to a respective function call each time encountered. An interceptor intercepts the function calls, converts each into a corresponding trace entry comprising a set of one or more trace operations, and inserts the trace entries one after another into the trace buffer to thereby form a linear trace of the source program. A trace manager transfers trace instances from the trace buffer to at least one compiler for compilation into corresponding compiled code, each trace instance comprising a current instance of the trace in the trace buffer or a portion thereof. The trace manager receives back the compiled code compiled from each trace instance, (Continued)

and sends it on to at least one destination device to be executed.

20 Claims, 3 Drawing Sheets

(56) References Cited

U.S. PATENT DOCUMENTS

| | | | |
|---|---|---|---|
| 2010/0313079 A1 | 12/2010 | Beretta et al. | |
| 2013/0091387 A1* | 4/2013 | Bohnet | G06F 11/3612 |
| | | | 714/45 |
| 2014/0215444 A1* | 7/2014 | Voccio | G06F 11/3644 |
| | | | 717/128 |
| 2015/0058606 A1* | 2/2015 | Madampath | G06F 11/3624 |
| | | | 712/236 |
| 2015/0058825 A1* | 2/2015 | Madampath | G06F 11/3082 |
| | | | 717/128 |
| 2017/0255545 A1* | 9/2017 | Voccio | G06F 11/3636 |
| 2020/0019483 A1 | 1/2020 | Norrie | |
| 2020/0104136 A1 | 4/2020 | Whalley | |
| 2020/0233781 A1 | 7/2020 | Hoermann | |
| 2021/0048991 A1 | 2/2021 | Tanner | |
| 2021/0149788 A1 | 5/2021 | Downie | |

OTHER PUBLICATIONS

Agrawal., "TensorFlow Eager: A Multi-Stage, Python-Embedded DSL for Machine Learning", arXiv:1903.01855, Feb. 27, 2019, 12 pages.
Extended European Search Report Issued in European Application No. 21182441.2, Dec. 9, 2021, 11 pages.
Inoue, et al., "Adaptive Multi-Level Compilation in a Trace-Based Java JIT compiler", In Journal of ACM SIGPLAN Notices, vol. 47, Issue No. 10, 2012, pp. 179-193.
International Search Report and Written Opinion Issued in PCT Patent Application No. PCT/US22/032924, Sep. 16, 2022, 14 pages.
Suhan, et al., "LazyTensor: combining eager execution with domain-specific compilers", arXiv:2102.13267, Feb. 26, 2021, 15 pages.
Communication under Rule 71(3) Received for European Application No. 22734728.3, mailed on Mar. 11, 2025, 6 pages.
Decision to Grant pursuant to Article 97(1) received in European Application No. 22734728.3, mailed on Jul. 3, 2025, 2 pages.

* cited by examiner

COMPILATION SYSTEM AND METHOD

BACKGROUND

There are two kinds of programming framework commonly used in machine learning (ML): a) old-school graph-based frameworks like TensorFlow 1, and b) eager execution frameworks like PyTorch or TensorFlow 2. Eager execution steps through the source program sequentially and dispatches each operation from the source program to be executed immediately, as-and-when they are encountered. A graph-based approach on the other hand compiles the entire program in advance based on a graph representing relationships between the various variables and operations within the source program, and then only once compiled executes the compiled program.

Eager and graph-based programming frameworks can also be extended to other applications, not just machine learning.

Both frameworks have advantages and disadvantages. Eager frameworks are considered easier to work with, and hence they are more popular nowadays. They are also more suitable for dynamic programs such as dynamic machine learning models, as the program may execute different parts of the code in different iterations (e.g. training batches or epochs). This is not easily captured in a single data-flow graph. However, with a graph-based framework, then once compiled the program typically runs faster as the compiler can see the whole program in advance and hence find potential efficiencies to compile it better. As a simple example, a matrix multiplication followed by an addition, expressed as separate successive operations in the source code, can be more efficiently compiled together than individually (because both a matrix multiplication and a matrix addition involve cycling through multiple elements in different dimensions, and it is more efficient to multiply and add to each element as you go rather than perform the whole matrix multiplication on its own and then add the whole matrix addend after that). However, a downside to compilation is that the initial compilation takes time. Other downsides are lack of support for dynamic models, and being harder to debug (e.g. as shape mismatches only show up after compilation during execution). Plus usually these compilers don't take execution statistics into account, so they miss out on optimizations.

SUMMARY

The disclosed approach provides a hybrid of the two frameworks, in that it allows the compiler to see a window of operations in advance (a trace) and compile it better than eager frameworks do (as they can only see one instruction at a time). This therefore allows the compiler to find efficiencies within the window (a subset of the operations in the source program), but does not incur the delay or rigidity of compiling the entire program in advance.

According to one aspect disclosed herein, there is provided a system capable of compiling a source program that comprises a plurality of source operations and one or more loops and/or branches, thereby defining a non-linear sequence of execution of the source operations; wherein the system comprises: a dispatcher, a trace buffer, an interceptor, and a trace manager. The dispatcher is configured to step through the sequence including looping through the loops and/or branching at the branches, and to map each source operation to a respective function call each time encountered during the stepping through of the sequence. The interceptor is configured to intercept the function calls from the dispatcher, convert each into a corresponding trace entry comprising a set of one or more trace operations, and insert the trace entries one after another into the trace buffer to thereby form a linear trace of the source program. The trace manager is configured to transfer each of a succession of trace instances from the trace buffer to at least one compiler for compilation into corresponding compiled code, each trace instance comprising a current instance of the trace in the trace buffer or a portion thereof. The trace manager is further arranged to receive back the compiled code compiled from each trace instance, and forward the compiled code to at least one destination device to be executed.

According to further aspects there are also provided a corresponding method and computer software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

The present disclosure provides a system and method which intercepts the instructions from an eager execution framework, piles them into a trace, and compiles operations from the trace. This enables better compilation as now the compiler can look into the future, but without incurring the delay and complexity of compiling the full program in advance.

In embodiments for example, the contents of the trace may only be executed when the result of any of the instructions is observable by the program, or when the contents of the trace meet some heuristic rule or are recognized as matching a previously compiled run of instructions for which the previously compiled code has been cached.

In an example use case, this may be used to enable eager execution frameworks for machine learning (such as PyTorch) to run faster, and to do automatic distribution and parallelization of programs.

Another advantage of intercepting the execution is that, in embodiments, now the compiler is free to automatically chose which device to use. The compiler can use multiple devices (e.g. GPUs) and select the one that is more appropriate to run each trace (e.g. because the data it needs is located there, or because that device is idle, etc). The compiler can also move data between devices as it collects statistics on the execution and decides it is more efficient to move the data and/or change the layout. These kinds of decision usually don't pay off if the compiler can't peek into the future and only sees one instruction at a time.

Additionally, in embodiments the system can sustain hardware failures. If a device fails, the monitor alerts the compiler, which will now take into account that it has fewer hardware resources available and therefore may have to compile the traces differently.

In embodiments, the system keeps statistics on traces. For example, it keeps a list of the most frequently executed traces, and spends more time optimizing these. The compiler can have a tiered approach to optimization, with more optimizations used for more frequent traces.

The system may have multiple backends to compile the traces, and may dynamically decides which backend to use, based on the trace statistics, foreseen opportunities for fusion, estimated execution time, and/or whether the backend has support for all the instructions, etc.

Figure 1:
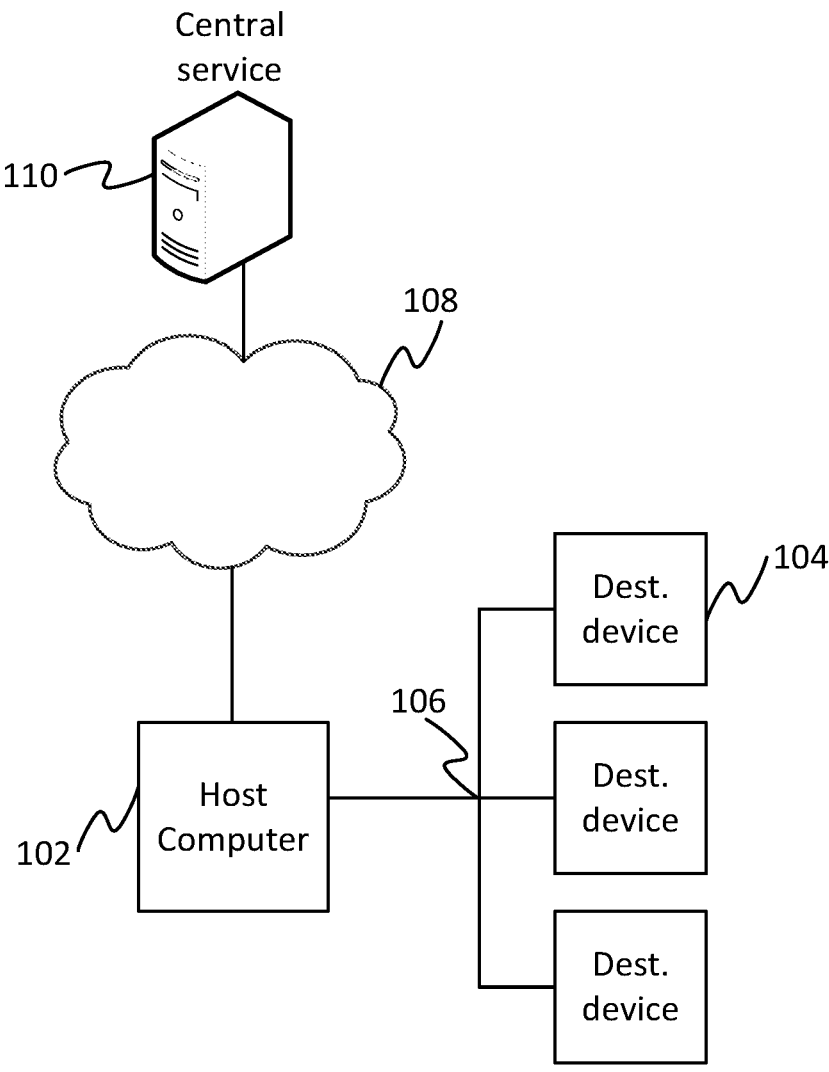
FIG. 1 is a schematic block diagram of a system comprising a host computer and one or more destination devices.

Such techniques may be employed to enable faster training and inference of machine learning models, plus fault-tolerance and automatic distribution and horizontal and vertical scaling of models. However the applicability of the disclosed techniques is not limited to machine learning. FIG. 1 gives a block diagram of a system in accordance with embodiments disclosed herein. The system comprises a host computer 102, and one or more destination devices 104 connected to the host computer 102 via an interconnect fabric 106.

Each of the host computer 102 and destination device(s) 104 comprises a respective one or more processors, each processor comprising one or more cores. In embodiments, the host computer 102 comprises a CPU (central processing unit) and each of the destination devices comprises an accelerator processor or co-processor to the CPU, such as a GPU (graphics processing unit), ML accelerator processor, cryptoprocessor, DSP (digital signal processor) or the like. However in other embodiments it is not excluded that the host computer 102 itself could comprise one or more application specific processors of these kinds or others, and/or that the destination devices 104 could comprise one or more general purposes CPUs.

The host computer 102 may be implemented as part of a server comprising one or more server units located at one or more geographic sites. In such embodiments the host computer may be arranged to provide one or more services to other, client computers (not shown) via a network such as the Internet, a mobile cellular network, or an internal intranet within an organization. For instance the source program (discussed shortly)—e.g. a machine learning program—may be compiled and run for the benefit of, or at the request of, one or more client computers. In this case results of the corresponding compiled program may be supplied back from the host computer 102 to the one or more client computers via the network. In other embodiments however the host computer 102 may be implemented in a stand-alone computer terminal such as a desktop or laptop computer, tablet, smart-phone or wearable device.

Each destination device 104 may be implemented as one or more processors in the same housing as the host computer 102, e.g. in the same rack or tower or on the same board, or alternatively they may be implemented externally to the host computer 102, in a different housing. In the latter case, they could for example be implemented in separate computer terminals such as desktops, laptops, smartphones, etc., or in dedicated peripheral processing devices. In the case of multiple destination devices 104, it is also possible that some are internal to the housing of the host computer 102 and some are external.

The interconnect fabric 106 may take any suitable form for connecting between the hoist computer 102 and destination device(s) 104, e.g. an internal bus, a storage area network, a local area network, a campus area network, or even a wide area network such as the Internet, etc., or any combination of these and/or other types.

Optionally, the host computer 102 may be connected to a central service 110 via a network 108 such as the Internet, a mobile cellular network or other wide area network, or a campus area network, etc., or any combination of these and/or other types. This may or may not comprise the same network as that used in embodiments to connect the host computer 102 to one or more client computers (not shown) as discussed above. The central service 110 comprises a server comprising one or more server units located at one or more geographic sites. The central service 110 is connected via the network 108 to one or more other host computers 102 of other systems (not shown), each of which may be arranged as described in relation to FIG. 1 and configured to perform a separate instance of the disclosed method. At least some of these systems may be arranged to share their compiled pieces of code with the central service 110, which acts as a central cache making this compiled available to some or all of the other instances of the system. E.g. these different systems may be run by different parties which may be different individuals, parties in different organizations, or different departments within an organization, or a combination of these possibilities.

Figure 2:
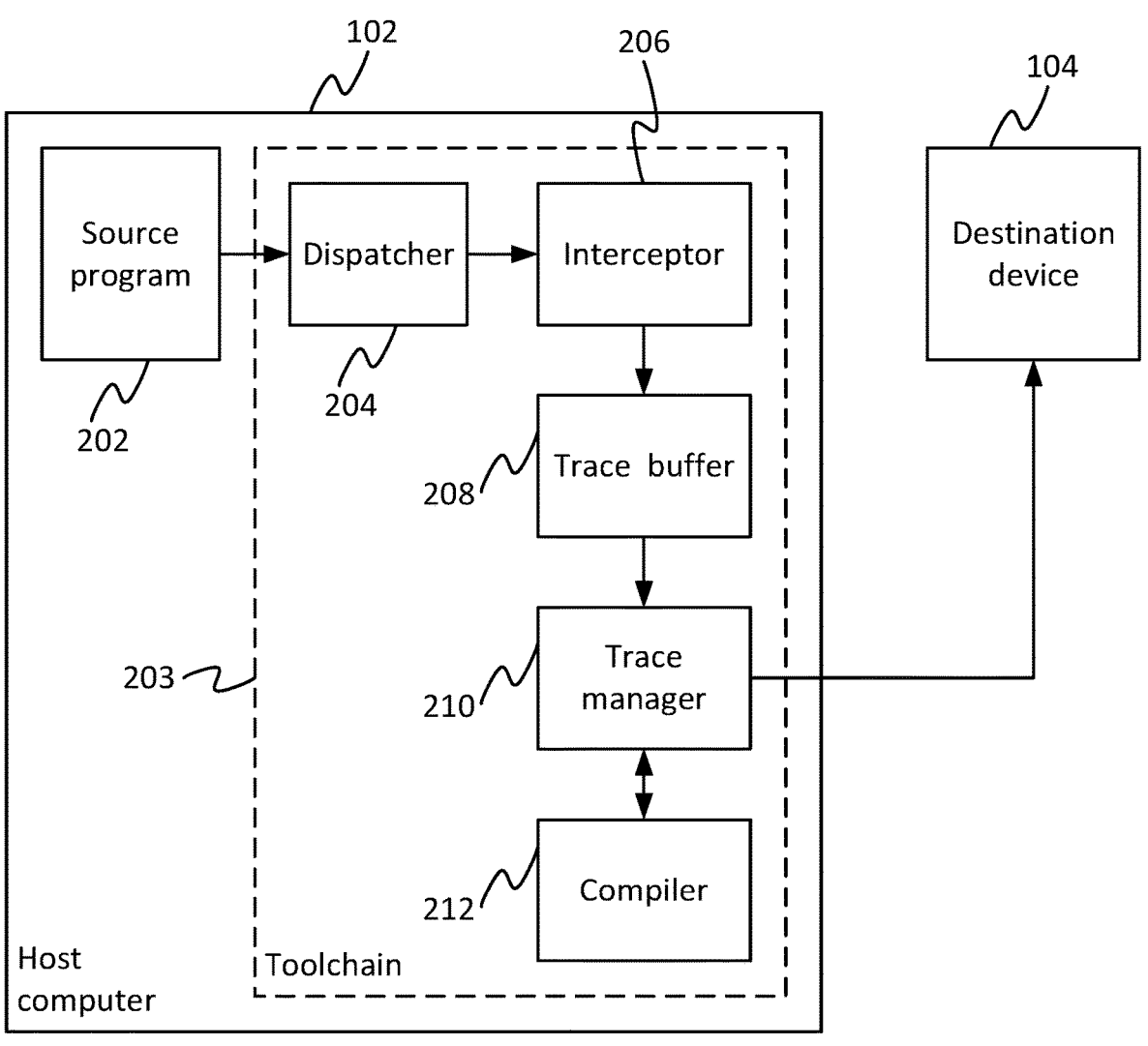
FIG. 2 is a schematic block diagram showing a toolchain for use in compiling a source program.

FIG. 2 gives a schematized block diagram showing a toolchain 203 which may be implemented on the host computer 102 of a given instance of the system. The host computer 102 comprises a source program 202 and a toolchain 203. The source program 202 is the program to be compiled and run on one or more of the destination devices 104. The toolchain 203 comprises a dispatcher 204, an interceptor 206, a trace buffer 208, a trace manager 210, and at least one compiler 212. The dispatcher 204 is arranged to receive source code from the source program 202 as an input, and to output function calls based on the source code. The Interceptor 206 is arranged to intercept the output of the dispatcher 204, and based thereon to insert trace operations into the buffer 208. The trace manager 210 is operatively coupled to the trace buffer 210 and arranged to monitor the contents of the trace buffer 208. The trace manager 210 is also operatively coupled to the compiler(s) 212 and the destination device(s) 104. This enables the trace manager 210 to send batches of trace operations from the trace buffer 208 to one or more compilers 212, receive back compiled code compiled based thereon, and send the compiled code to one or more destination devices 104 to be executed.

Each of the source program 202, dispatcher 204, interceptor 206, trace manager 210 and compiler(s) 212 is implemented as a module of code stored in a memory of the host computer 102, and the trace buffer 208 is implemented as a region of memory. Such memory may comprise one or more memory devices internal or external to the host computer 102, or a combination. E.g. the memory may be implemented on the same chip or board, or as a separate unit in the same housing (e.g. internal HDD or SSD); or it may be implemented externally to the housing of the host computer 102 (e.g. an external HDD or SSD, which may be accessible via a local external connection or a network). Different ones of the modules 202, 204, 206, 208, 210, 212 may be implemented in different regions of the same memory device or on different memory devices, or a combination. Any such memory device may employ any suitable storage medium, e.g. an electronic or silicon-based medium such as DRAM, SRAM, EEPROM, flash memory, or a silicon-based ROM, etc.; a magnetic medium such as magnetic disk drive, magnetic tape, magneto-optical memory, etc.; an optical medium such as an optical disc or quartz glass storage; or even more exotic forms such as synthetic biological storage; or any combination.

Each of the dispatcher 204, interceptor 206, trace manager 210 and compiler(s) 212 is arranged to run on at least one processor of the host computer 102. They may all run on the same processor, or different processors of the host computer 102, or a combination. E.g. the dispatcher 206, interceptor 206 and trace manger 210 may run on the same CPU whilst at least one compiler could run on one or more separate processors of the host computer 102 in the same or a separate housing as the CPU.

The source program 202 is written in a source language, which may be a high-level language, i.e. human-readable code. E.g. in embodiments the source program 202 may be written in Python and may comprise functions of one or more PyTorch libraries. The source program comprises a plurality of source operations, each expressed as an expression in the source language. The source program also comprises one or more loops and/or branches, also expressed as expressions in the source language. Thus the operations will run in a non-linear sequence. In other words it is not a straight-line program (the operations will not necessarily each just be run once from start to end: some may be repeated, and/or some may never be run at all depending on the evaluation of a branch). Note of course that the system is not necessarily only capable of compiling non-straight-line programs. In embodiments it may be applicable to both straight-line and non-straight-line programs.

In embodiments the source program 202 may comprise a machine learning program comprising a machine learning model (e.g. neural network) and a machine learning algorithm configured to train parameters of the model. In embodiments the source program may be a dynamic program, which comprises data-dependent code that takes different branches, e.g. depending on values of external and/or random data, or in dependence on an outcome of an earlier part of the program or results of a previous iteration of the program that has been compiled and run on at least one destination device 104. This breaks traditional data-flow graph frameworks, as these graphs don't represent case-splitting efficiently. For example in embodiments the source program 202 may comprise a dynamic machine learning model, that takes different branches based on how the training goes. It's data-dependent code that takes different branches based on how the training goes.

The dispatcher 204 is configured to step through the sequence of the source program, including looping through the loops and/or branching at the branches, and in doing so to convert each source operation it encounters into a respective function call, each time encountered during the stepping through of the sequence (e.g. so if an operation is looped N times, it will be converted to N function calls). Each function call comprises a pointer to a function for running the operation on a target device. Each function call may also comprise one or more parameters of the corresponding function.

The dispatcher 204 specifies a target device which is initially intended to be the destination device upon which the dispatched operation is intended to be run (by running a function which interprets the source code expression of the operation in question). E.g. the target device may be specified as a parameter of the function call. The target device may be specified in terms of a specific individual device, or alternatively just the kind of device (e.g. knowing it's a GPU may be sufficient even if the host has more than one GPU). Usually all functions called by the dispatcher run on the CPU of the host computer 102, and then it's these functions that interact with the target device. So a dispatcher doesn't necessarily interact directly with the devices. However it is not excluded that the function call could point directly to a function on a target device.

In any case, in the system disclosed herein the interceptor 206 is arranged to intercept the function calls from the dispatcher. Due to the action of the interceptor 206, the target device specified by the dispatcher may or may not end up being the actual destination device 104 on which the code compiled from the source is ultimately run. The function call need never actually be called. Instead, the interceptor 206 is configured to intercept the function calls from the dispatcher 204, and to convert each into a corresponding trace entry comprising a set of one or more trace operations, and insert the trace entries one after another into the trace buffer 208 to thereby form a linear trace of the source program. In embodiments, the interceptor 206 may do this by converting the function call to a pointer to an intercepting function, and calling the intercepting function in order to generate the corresponding trace entry.

A trace comprises a sequence of operations. Each line in the trace is an operation (which could also be called an instruction) expressed in a form that is recognized by one or more types of compiler 212. The usual name of the set of allowed operations in a compiler is either intermediate representation (IR) or intermediate language (IL). One source operation (e.g. from PyTorch) is translated into one or more operations in the trace. In other words, each trace operation in the trace may be expressed as an intermediate representation (IR), i.e. in an intermediate language (IL), between the high-level language and the compiled code. Compiler IRs tend to have fewer operations that those exposed to users, so one operation as performed by the source program 202 may be translated into more than one IR operation in the trace. So it's not necessarily a one-to-one mapping.

The interceptor 206 thus converts the source code, written in the source language, into a linear series of instruction which is understandable by the compiler and which is expressed in an intermediate representation which is preferably agnostic of the source language. The trace is described as linear in that the dispatcher 204 has linearized the loops and branches from the source program (i.e. turned it from a non-straight-line program in the source code into a straight-line program in the intermediate representation).

Where it is said that the trace entries are inserted into the trance buffer 208 one after another, this means that each trace entry is inserted in order behind the previously generated entry in the trace buffer. In other words, the trace entries are inserted in the same order as the corresponding source operations were encountered in the stepping through of the source program.

As a simple example, the following is a source program that includes a branch.

```
if wd!=0:
    z=x.add(y,alpha=−wd*lr)
else:
    z=x.add(w)
x.mul_(z)
z=None
print(x)
``` where wd is weight decay, lr is learning rate, and alpha is an optional parameter. The operation z=x.add(y, alpha=−wd*lr) performs z=x+y*alpha, where alpha=−wd*lr.

There are two possible traces of this, depending on the evaluation of the branch:

$$z=x.\text{add}(y,\text{alpha}=-wd^*lr)$$

x.mul_(z)

or:

$$z=x.\text{add}(w)$$

x.mul_(z)

(in the trace these operations would be represented in the intermediate representation, but for illustrative purposes they are shown here still in the source language).

As another example, the following source code contains a loop:

for i in range (4):

x.add_(y)

For this there is only one trace:

x.add_(y)

x.add_(y)

x.add_(y)

x.add_(y)

The trace manager 210 is configured to monitor the trace in the trace buffer 208, and to transfer each of a succession of trace instances from the trace buffer to at least one compiler 212 for compilation into corresponding compiled code. Each trace instance comprises a current instance of the trace from the trace buffer 208, or a portion thereof. Each trace instance is then compiled into a corresponding piece of compiled code by the compiler 212 to which it is transferred. Where it is said that the trace or a portion thereof is transferred from the trace buffer 208 to a compiler 212, this means that it is removed from the trace buffer 208 in the process (making more space for new trace operations to be inserted into the buffer 208). If only a portion of the current trace is transferred to the compiler 212, then the remaining portion may be shifted forward to the front of the trace buffer 208 and the interceptor 206 continues to fill the trace buffer 208 with subsequent trace entries in turn behind the remaining portion.

There are a number of possible triggers the trace manager 210 may use to determine when to transfer a portion of the trace to a compiler 212 for compilation. These will be discussed in more detail shortly.

In some embodiments, a given trace instance could be sent to multiple compilers 212 to be compiled into different versions of the compiled code according to the compilation methods employed by each individual compiler. The trace manager 210 may compare the code compiled by different compilers 212 and select which compiler to use in future based on this comparison. The trace manager 210 is arranged to receive back each piece of compiled code from whichever compiler or compilers 212 they were sent to, and forward these pieces of compiled code on to at least one a destination device 104 to be executed. In embodiments, different pieces could be sent to different destination devices 104 for execution, and/or a given piece of compiled code could be sent to different destination devices 104 to duplicate the execution. The trace manager 210 may compare the execution by the different destination devices 104 and select which to use in future based on this comparison.

As mentioned, due to the interception, the at least one destination device 104 may comprise the same target device that the dispatcher 204 originally dispatched to, or one or more different devices, or a combination of the same device and one or more different devices. In the case where they are different, the code may never be run on the originally intended target device. In embodiments, the dispatcher 204 may be a completely conventional dispatcher that is programmed to dispatch to a "dummy" target device, and which does not know or need to know that its function calls are being intercepted.

There are a plurality of different options for how the trace manager 210 may decide when to transfer the trace, or a portion of the trace, from the trace buffer 208 to the compiler(s) 212 for compilation. Depending on implementation, any one, more or all of these options may be used as conditions for transferring the trace.

A first option is simply to transfer the trace each time it reaches a predetermined length. For example the trace buffer 208 may have a finite size (e.g. 64 operations), and the trace manager 210 may simply empty the trace buffer 208 every time it fills up with trace operations.

Alternatively or additionally, the trace manager 210 may be operable to pick out portions of variable length sized from the trace within the trace buffer 208.

For instance as a second option, the trace manager 210 may be configured with one or more heuristic rules for identifying batches of trace operations which can be efficiently compiled. E.g. as mentioned in the Background section, a matrix multiplication followed by an addition can be more efficiently compiled together than individually. Efficiencies such as these, based on synergistically compiling related operations are, in themselves, a known capability of existing compilers given a sequence of operations expressed in an intermediate representation recognized by the compiler. When the trace manager 210 recognizes a portion of the trace in the trace buffer which meets one of the heuristic rules, it will transfer the portion from the trace buffer 210 to at least one compiler 212 for compilation (removing that portion from the trace buffer 208 in the process). Any remaining trace operations may be shifted forward, in order, to the front of the buffer 208.

As a third option, the trace manager 210 may be configured to keep a cache of previously compiled pieces of code and their corresponding trace operations. This cache may be kept in a memory of the host computer 102. And/or, the central service 110 may maintain such a cache based on pieces of code submitted by the system and/or other, similar systems (e.g. rub by other parties) via the network 108. Either way, if the trace manager 210 recognizes a portion of the trace in the trace buffer 208 as matching that of a previously compiled piece of code, it can automatically send the corresponding cached piece of code to a destination device 104 to be executed. In this case the compilation comes for free, as the result of a previous compilation of the same batch of operations has already been cached. Note that the values of variables or parameters of the trace operations can be different, as long as the types and order of the trace operations match.

In such embodiments, if the trace manager 210 does see the same trace again, it does not need to not call the compiler 212 again. Optionally however it may want to recompile the trace with more powerful optimizations if the trace is determined to be frequent.

In the case where a central service 110 is used to cache pieces of compiled code and their corresponding trace operations from different systems (e.g. of different parties), this advantageously provides a central resource for sharing previously or commonly compiled pieces of code, which can then be re-used between different systems or parties. This is even more efficient than each system or party having to independently learn which batches of trace operations of code tend to occur repeatedly.

As a fourth option, the trace manager 210 may be configured to transfer the trace to be compiled as soon as it detects a trace operation which is observable. In such embodiments, each trace operation produced by the interceptor includes a flag recording whether or not the operation outputs an observable variable. "Observable" in this context means the program still holds a reference to the variable, meaning the program may output the variable in an observable manner in the future. For example, this could be printed on a screen, or played out audibly or visibly, or used to control a peripheral device, etc. The reason for immediately compiling a trace as soon as it contains an observable variable is that the program may at any point demand to observe the variable, e.g. in response to an unpredictable external stimulus such as a user input.

In further alternative or additional embodiments, trace manager 210 may be configured to collect statistics on a first one or more, previously-compiled trace instances. These statistics may comprise one or more of: i) a compilation time of the compilation of the first one or more trace instances when compiled by a compilers 212, ii) an execution time of the corresponding compiled code on a target device 104, iii) a frequency of repetition of one or more trace instances (i.e. how commonly does it occur in the trace buffer 208), iv) a memory utilization of the corresponding compiled code on a target device 104, and/or v) a device health of the destination device 104 used to run the corresponding compiled code. Based on such statistics, the trace manager 210 may then select which of multiple compilers 212 to use as the at least one compiler to compile one or more second, subsequent trace instances, and/or to select a tier of a tiered optimization algorithm of at least one compiler 212 used to compile the second one or more trace instances.

The information on which trace operations have observable variables may also be provided to the compiler 212. This information provides further opportunities for optimization in the compilation. It is, in itself, an existing feature of known compilers to optimize compilation based on which variables are observable, and so the compiler will know what to do with this formation assuming it is expressed in a known format in the intermediate representation.

In some embodiments, the trace manager 210 may transfer the first one or more trace instances to multiple compilers 212, then based on the observations select one or more of the multiple compilers to use for the one or more second trace instances. Alternatively, as another possibility, the trace manager 210 may send the code compiled from the first one or more first trace instances to a first one of the multiple compilers 212, then based on the observations select whether to switch to a second, different one of the multiple compilers for the second one or more trace instances. For example, the trace manager 210 may keep a list of the most frequently executed traces, and spend more time or resources optimizing these. E.g. the compiler 212 can have a tiered approach to optimization, with more optimizations used for more frequent traces. As another example, the trace manager 210 may collect statistics on how long pieces of code take to compile, how long they take to execute, and/or how successful they are, and based on this adapt the selection of which compiler 212 to use and/or which compilation tier to use for future traces. E.g. it could initially begin by requesting a compiled piece of code for a given trace instance from multiple compilers 212, then compare the results and select which is fastest to compile or which results in the fastest executing code for future use.

In further alternative or additional embodiments, the trace manager 210 may be configured to observe resource usage on multiple candidate devices—these being devices (such as GPUs or other accelerator processors) which could potentially be selected as a destination device 104 for executing a piece of compiled code. The resource usage could be, for example, processor cycles per unit time, memory usage, or. Based on this, the trace manager 210 may select which candidate to use as the at least one destination device 104. And/or, it may select whether to migrate operand data from one of the candidate devices to the destination device (the operand data being data to be operated upon by the compiled code). For instance, in one example, the trace manager 210 may observe which of multiple candidate devices 104 (e.g. GPU) is free (or at least has suitable available processing and memory resource). It may also observe which candidate device or devices 104 the operand data for a particular piece or pieces of compiled code are currently stored on. It a first of the candidate devices 104 has more available processing resources, but a second of the candidate devices has more of the operand data, the trace manager 210 may transfer the code to the first candidate device as the destination device 104, but also control the second candidate device (via the fabric 106) to migrate some or all of the operand data to the first device. Alternatively or additionally, the trace manager 210 may reorganize the way that data is laid out in memory on a destination device 104. E.g. whether a matrix is transposed in memory can affect the complexity of an operation. The reorganization could be done based on a cost model of the hardware of the destination device 104, or based on trial and error.

In yet further alternative or additional embodiments, the trace manager 210 may be configured to cache the compiled code corresponding to at least some of the trace instances in a cache, along with a record of the corresponding trance instances themselves. The cache may be implemented in a memory of the host computer 102, or at the central service 110, or both (and in the case of the central service 110 the cache may also comprise code cached by other similar systems, e.g. run by other parties). The trace manager 210 may then detect in the trace buffer 208 a most-recent run of contiguous trace operations which matches an initial, contiguous subset of the trace operations from a previously compiled trace instance. Based on this, then trace manager 210 can then speculatively send a copy of the compiled code corresponding to the previously-compiled trace instance from the cache to at least one destination device for speculative execution.

As the compiled code is cached, then the trace does not need to be sent again to a compiler 212, but rather just sent for execution. The idea is that after observing just a few operations, the trace manager 210 can guess how the rest of the trace looks like (because the current buffer is a prefix of a previously seen trace), and therefore speculatively execute a longer, known, trace. If the guess is wrong, the effects of the wrong trace will be rolled-back in the destination device 104.

Figure 3:
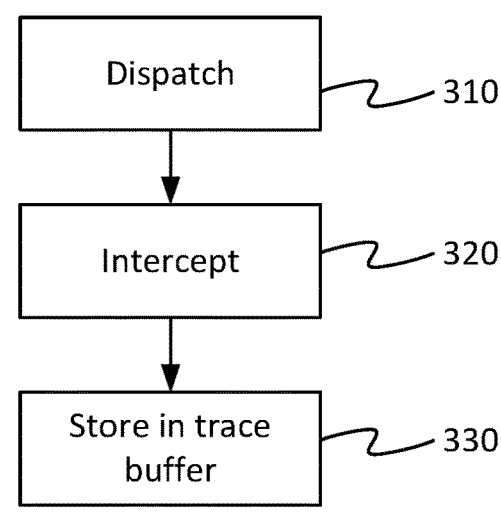
FIG. 3 is a flow chart of a method of writing to a trace buffer.

FIG. 3 gives a flow chart showing a method of populating the trace buffer 208. At step 310 the dispatcher 204 dispatches a function call based on a source operation in the source code 202. At step 320 the interceptor 320 intercepts the function call and converts to a trace entry comprising one or more trace operations expressed in an intermediate representation. At step 330 the interceptor inserts the trace entry into the tail of the trace buffer 208. The steps 310-330 are repeated for multiple source operations, each being processed in turn in the order defined in the source program. Note that this may be done in a pipelined manner (while the interceptor 206 is intercepting the first source operation at step 320, the dispatcher 204 may begin performing step 310 for the next source operation in the sequence, etc.). The method may be split into more pipeline stages than shown in FIG. 3.

Figure 4:
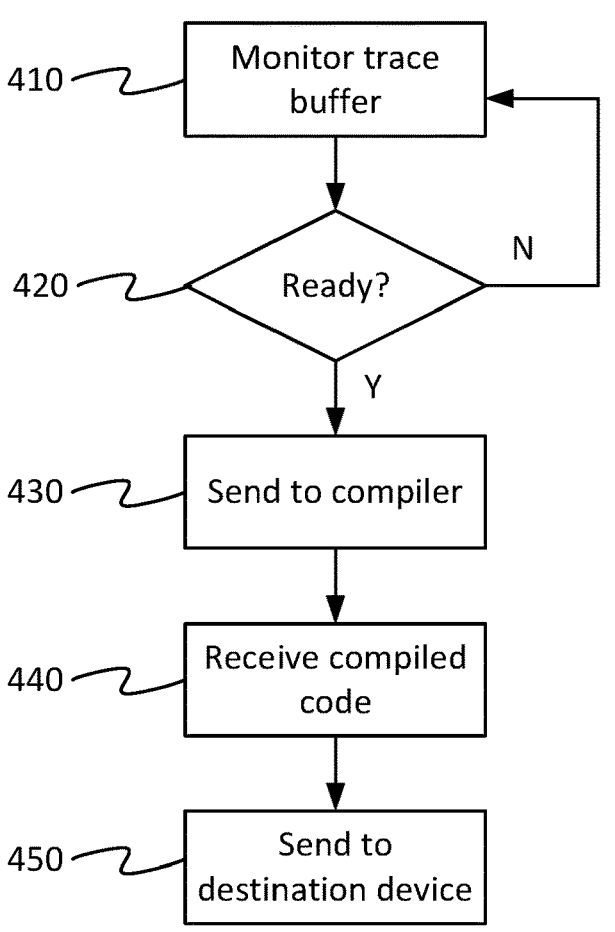
FIG. 4 is a flow chart of a method of consuming contents of a trace buffer.

FIG. 4 gives a flow chart of a method of consuming trace operations from the trace buffer 208. At step 410 the trace manager 210 monitors the current trace in the trace buffer 208. At step 420 it determines whether a trace instance is ready to be transferred from the trace buffer 208 to a compiler 212 (e.g. because it contains an observable operation or meets a heuristic rule). If not, it loops round to stop 410 to keep monitoring. If so however, the method proceeds to step 430 where the trace manager sends the trace instance to at least one compiler 212 to be compiled (removing the trace instance from the trace buffer 208 and shifting forward any remaining portion of the trace, if any, to the front of the buffer 208). At step 440 the trace manager receives back the corresponding compiled piece of code. At step 450 the trace manager 210 forwards this to at least one target device 104 to be executed.

It will be appreciated that the above embodiments have been described by way of example only. More generally, according to one aspect disclosed herein, there is provided system capable of compiling a source program that comprises a plurality of source operations and one or more loops and/or branches, thereby defining a non-linear sequence of execution of the source operations. The system comprises a dispatcher, an interceptor, a trace buffer and a trace manager. The dispatcher is configured to step through the sequence including looping through the loops and/or branching at the branches, and to map each source operation to a respective function call each time encountered during the stepping through of the sequence. The interceptor is configured to intercept the function calls from the dispatcher, convert each into a corresponding trace entry comprising a set of one or more trace operations, and insert the trace entries one after another into the trace buffer to thereby form a linear trace of the source program. The trace manager is configured to transfer each of a succession of trace instances from the trace buffer to at least one compiler for compilation into corresponding compiled code, each trace instance comprising a current instance of the trace in the trace buffer or a portion thereof. The trace manager is further arranged to receive back the compiled code compiled from each trace instance, and forward the compiled code to at least one destination device to be executed.

In embodiments, the trace manager may be configured, for at least a first one or more of the trace instances, to collect statistics on one or more of: i) a compilation time of the compilation of the first one or more trace instances, ii) an execution time of the corresponding compiled code, iii) a frequency of repetition of one or more trace instances, iv) a memory utilization of the corresponding compiled code, and/or v) a device health of the destination device used to run the corresponding compiled code. Based on said statistics, the trace manager may select which of multiple compilers to use as the at least one compiler to compile a second one or more of the trace instances, and/or to select a tier of a tiered optimization algorithm of the at least one compiler used to compile the second one or more trace instances.

In embodiments, the trace manager may be configured to monitor resource usage on multiple candidate devices. Based on this, the trace manager may select which to use as the at least one destination device, and/or whether to migrate operand data from one of the candidate devices to the destination device (the operand data being data to be operated upon by the compiled code). In embodiments, the trace manager may be configured to cache the compiled code corresponding to at least some of the trace instances in a cache. In such embodiments, the trace manager may be configured to detect in the trace buffer a most-recent run of contiguous trace operations which matches an initial, contiguous subset of the trace operations from a previously compiled trace instance. Based on this, the trace manager may speculatively send a copy of the compiled code corresponding to the previously-compiled trace instance from the cache to at least one destination device for speculative execution.

In embodiments, each of some or all of the trace operations may record whether or not any variable operated upon by that trace operation is observable. This may enable the at least one compiler to optimize compilation according to whether the variables are observable.

In embodiments, the trace manager may be configured to monitor the trace in the trace buffer, and perform the transfer of a trace instance from the trace buffer for compilation in response to the trace reaching a predetermined size.

In embodiments, the trace manager may be configured to: cache the compiled code corresponding to at least some of the trace instances in a cache; monitor the trace in the trace buffer; and detect in the trace buffer a repeated trace instance, being a portion of the trace comprising the same trace operations, with the same or different variable values, as a previous one of the trace instances which has already been compiled. In response to detecting the repeated trace instance, the trace manager may do one or both of the following. It may send the compiled code corresponding to the previous trace instance to at least one destination device from the cache to be executed. And/or the trace manager may transfer the repeated trace instance to be compiled by a higher power compiler than the previous instance, or by a higher tier of a tiered compilation algorithm than the previous trace instance.

In some such embodiments, the trace manager may be configured to perform said detection based on a central service logging pre-compiled trace instances from a plurality of systems of different parties.

In embodiments, the trace manager may be configured to monitor the trace in the trace buffer, and perform the transfer of a trace instance from the trace buffer for compilation based on a heuristic rule applied to the trace in the trace buffer.

In embodiments, the trace manager may be configured to monitor the trace in the trace buffer, and to perform the transfer of a trace instance from the trace buffer for compilation when an observable event occurs in the trace.

In an example use case, the source program may comprise a dynamic machine learning model. And/or, at least some of the source operations comprise tensor operations. And/or, the source program may be written in Python, and at least some of the source operations are functions of one or more PyTorch libraries.

In embodiments, the interceptor may be configured to intercept the function calls from the dispatcher, convert each into a corresponding trace entry comprising a set of one or more trace operations, and insert the trace entries one after another into the trace buffer to thereby form a linear trace of the source program, the linear trace comprising at least two trace entries.

Other variants or use cases of the disclosed techniques may become apparent to the person skilled in the art once given the disclosure herein. The scope of the disclosure is not limited by the described embodiments but only by the accompanying claims.

The invention claimed is:

1. A system capable of compiling a source program that comprises a plurality of source operations and one or more loops and/or branches, thereby defining a non-linear sequence of execution of the source operations, wherein the system comprises:

a dispatcher configured to step through the sequence including looping through the loops and/or branching at the branches, and to map each source operation to a respective function call each time encountered during the stepping through of the sequence;

a trace buffer;

an interceptor configured to intercept the function calls from the dispatcher, convert each into a corresponding trace entry comprising a set of one or more trace operations, and insert the trace entries one after another into the trace buffer to thereby form a linear trace of the source program; and a trace manager configured to transfer each of a succession of trace instances from the trace buffer to at least one compiler for compilation into corresponding compiled code, each trace instance comprising a current instance of the linear trace in the trace buffer or a portion thereof, the trace manager being arranged to receive back the compiled code compiled from each trace instance, and send the compiled code to at least one destination device to be executed.

2. The system of claim 1, wherein the trace manager is configured to:

for at least a first one or more of the trace instances, collect statistics on one or more of:

a compilation time of the compilation of the first one or more of the trace instances, an execution time of the corresponding compiled code, a frequency of repetition of one or more trace instances, a memory utilization of the corresponding compiled code, or a device health of the destination device used to run the corresponding compiled code; and based on said statistics, select which of multiple compilers to use as the at least one compiler to compile a second one or more of the trace instances, or to select a tier of a tiered optimization algorithm of the at least one compiler used to compile the second one or more of the trace instances.

3. The system of claim 1, wherein the trace manager is configured to:

monitor resource usage on multiple candidate devices; and based thereon select which to use as the at least one destination device, or whether to migrate operand data from one of the candidate devices to the destination device, the operand data being data to be operated upon by the compiled code.

4. The system of claim 1, wherein the trace manager is configured to:

cache the compiled code corresponding to at least some of the trace instances in a cache;

detect in the trace buffer a most-recent run of contiguous trace operations which matches an initial, contiguous subset of the trace operations from a previously compiled trace instance; and based thereon, speculatively send a copy of the compiled code corresponding to the previously compiled trace instance from the cache to the at least one destination device for speculative execution.

5. The system of claim 1, wherein each of some or all of the trace operations records whether or not any variable operated upon by that trace operation is observable, thereby enabling the at least one compiler to optimize compilation according to whether the variable is observable.

6. The system of claim 1, wherein the trace manager is configured to monitor the trace in the trace buffer, and perform the transfer of a trace instance from the trace buffer for compilation in response to the trace reaching a predetermined size.

7. The system of claim 1, wherein the trace manager is configured to:

cache the compiled code corresponding to at least some of the trace instances in a cache;

monitor the trace in the trace buffer;

detect in the trace buffer a repeated trace instance, being a portion of the trace comprising the same trace operations, with the same or different variable values, as a previous one of the trace instances which has already been compiled; and in response to detecting the repeated trace instance, one or both of:

send the compiled code corresponding to the previous one of the trace instances to at least one destination device from the cache to be executed, and transfer the repeated trace instance to be compiled by a higher power compiler than the previous trace instance, or by a higher tier of a tiered compilation algorithm than the previous one of the trace instances.

8. The system of claim 7, wherein the trace manager is configured to perform said detection based on a central service logging pre-compiled trace instances from a plurality of systems of different parties.

9. The system of claim 1, wherein the trace manager is configured to monitor the linear trace in the trace buffer, and perform the transfer of a trace instance from the trace buffer for compilation based on a heuristic rule applied to the trace in the trace buffer.

10. The system of claim 1, wherein the trace manager is configured to monitor the linear trace in the trace buffer, and to perform the transfer of a trace instance from the trace buffer for compilation when an observable event occurs in the trace.

11. The system of claim 1, wherein the source program comprises a dynamic machine learning model.

12. The system of claim 1, wherein at least some of the source operations comprise tensor operations.

13. The system of claim 1, wherein the source program is written in Python, and at least some of the source operations are functions of one or more PyTorch libraries.

14. A method of compiling a source program that comprises a plurality of source operations and one or more loops and/or branches, thereby defining a non-linear sequence of execution of the source operations; wherein the method comprises:

stepping through the sequence including looping through the loops and/or branching at the branches, and mapping each source operation to a respective function call each time encountered during the stepping through of the sequence;

intercepting the function calls, converting each into a corresponding trace entry comprising a set of one or more trace operations, and inserting the trace entries one after another into a trace buffer to thereby form a linear trace of the source program; and transferring each of a succession of trace instances from the trace buffer to at least one compiler for compilation into corresponding compiled code, each trace instance comprising a current instance of the linear trace in the trace buffer or a portion thereof, receiving the compiled code compiled from each trace instance; and sending the compiled code to at least one destination device to be executed.

15. The method of claim 14, further comprising:

collecting statistics on:

a compilation time of the compilation of a first trace instance of the trace instances, an execution time of the corresponding compiled code, a frequency of repetition of the first trace instance, a memory utilization of the corresponding compiled code, or a device health of the destination device used to run the corresponding compiled code; and based on the collected statistics, select which of multiple compilers to use as a compiler to compile a second trace instance.

16. The method of claim 14, further comprising:

monitoring resource usage on candidate devices; and based thereon, select which of the candidate devices to use as the destination device.

17. The method of claim 14, further comprising:

caching the compiled code corresponding to the trace instances in a cache;

detecting, in the trace buffer, a most-recent run of contiguous trace operations which matches an initial, contiguous subset of the trace operations from a previously compiled trace instance; and based thereon, speculatively sending a copy of the compiled code corresponding to the previously compiled trace instance from the cache to the destination device for speculative execution.

18. The method of claim 14, wherein transferring each of the succession of the trace instances from the trace buffer to the at least one compiler comprises:

monitoring the trace in the trace buffer, and performing the transfer of a trace instance from the trace buffer for compilation in response to the trace reaching a predetermined size.

19. The method of claim 14, further comprising:

caching the compiled code corresponding to the trace instances in a cache;

monitoring the trace in the trace buffer;

detecting in the trace buffer a repeated trace instance with the same or different variable values, the repeated trace instance being a portion of the trace comprising the same trace operations as a previous one of the trace instances which has already been compiled; and in response to detecting the repeated trace instance:

sending the compiled code corresponding to the previous one of the trace instances to the destination device from the cache to be executed, or transferring the repeated trace instance to be compiled by a higher power compiler than the previous one of the trace instances, or by a higher tier of a tiered compilation algorithm than the previous trace instance.

20. A software toolchain for use in compiling a source program that comprises a plurality of source operations and one or more loops and/or branches, thereby defining a non-linear sequence of execution of the source operations; wherein the software toolchain is embodied on a non-transitory computer-readable storage and is configured so as when run on a host computer to perform operations of:

stepping through the sequence including looping through the loops and/or branching at the branches, and mapping each source operation to a respective function call each time encountered during the stepping through of the sequence;

intercepting the function calls, converting each into a corresponding trace entry comprising a set of trace operations, and inserting the trace entries one after another into a trace buffer to thereby form a linear trace of the source program; and transferring each of a succession of trace instances from the trace buffer to at least one compiler for compilation into a corresponding compiled code, each trace instance comprising a current instance of the linear trace in the trace buffer or a portion thereof, receiving the compiled code compiled from each trace instance; and sending the compiled code to a destination device to be executed.

* * * * *